United States Patent
Hauser et al.

(10) Patent No.: US 9,600,167 B2
(45) Date of Patent: Mar. 21, 2017

(54) SYSTEMS AND METHODS FOR A USER-ADAPTIVE KEYBOARD

(71) Applicants: Jasper Reid Hauser, San Francisco, CA (US); Luke St. Clair, Redmond, WA (US); Jenny Yuen, Cambridge, MA (US)

(72) Inventors: Jasper Reid Hauser, San Francisco, CA (US); Luke St. Clair, Redmond, WA (US); Jenny Yuen, Cambridge, MA (US)

(73) Assignee: Facebook, Inc., Menlo Park, CA (US)

( * ) Notice: Subject to any disclaimer, the term of this patent is extended or adjusted under 35 U.S.C. 154(b) by 39 days.

(21) Appl. No.: 13/631,297

(22) Filed: Sep. 28, 2012

(65) Prior Publication Data
US 2014/0096059 A1    Apr. 3, 2014

(51) Int. Cl.
G06F 3/048 (2013.01)
G06F 3/023 (2006.01)
G06F 3/0488 (2013.01)
G06F 3/0487 (2013.01)

(52) U.S. Cl.
CPC .......... *G06F 3/0487* (2013.01); *G06F 3/0237* (2013.01); *G06F 3/04883* (2013.01)

(58) Field of Classification Search
CPC ............................. G06F 3/0487; G06F 3/0237
USPC .................................. 715/771; 345/168, 173
See application file for complete search history.

(56) References Cited

U.S. PATENT DOCUMENTS

| | | | | |
|---|---|---|---|---|
| 8,312,373 | B2 * | 11/2012 | Kraft et al. | 715/702 |
| 8,648,809 | B2 * | 2/2014 | Wilson | 345/168 |
| 2009/0195506 | A1 * | 8/2009 | Geidl et al. | 345/168 |
| 2010/0259561 | A1 * | 10/2010 | Forutanpour et al. | 345/660 |
| 2010/0281268 | A1 * | 11/2010 | Barreto et al. | 713/182 |
| 2012/0075194 | A1 * | 3/2012 | Ferren | 345/168 |
| 2012/0119999 | A1 * | 5/2012 | Harris | 345/169 |
| 2012/0203544 | A1 * | 8/2012 | Kushler | 704/9 |
| 2013/0019191 | A1 * | 1/2013 | Arnold | 715/765 |

* cited by examiner

*Primary Examiner* — Andrea Long
(74) *Attorney, Agent, or Firm* — Baker Botts L.L.P.

(57) ABSTRACT

In one embodiment, a method includes detecting one or more user interactions, associated with a user of a computing device, each interaction occurring at a region associated with an input value, and determining, for at least one user interaction, that the at least one user intended to provide a different input value. Adaptation information is generated for the at least one user based on the at least one user interaction. The adaptation information is stored for the at least one user. A user interaction is detected at a region. The user's intended input value is determined based on the user interaction and the adaptation information.

20 Claims, 7 Drawing Sheets

SYSTEMS AND METHODS FOR A USER-ADAPTIVE KEYBOARD

FIELD OF THE DISCLOSED SUBJECT MATTER

The present disclosed subject matter relates to systems and methods for providing input to a computer system, including providing input to a mobile computing and/or communication system using an input device having an electronic visual display, such as a touch screen, and adapting characteristics of the input device to usage of particular users.

DESCRIPTION OF RELATED ART

Mobile computing and communication devices, such as cellphones, PDAs, tablet computers, and mini-laptops, are widely used to perform a variety of computing and communication tasks. Computing devices can include one or more input devices to receive input from a user, including a keyboard, pointing device, microphone, camera, or other suitable input device. Some computing devices can allow a user to provide input on an electronic visual display, such as a touch screen. In this manner, a user can provide input by touching a certain portions of the electronic visual display corresponding to a desired input. However, users can touch an incorrect portion of the electronic visual display, which can result in an incorrect input being provided, and thus the user can be required to undo the incorrect input and perform the input again. Such input errors can occur, for example, when the user intends to touch a particular portion of the display, and the computing device recognizes a different portion of the display as being touched. A user can make the same input error more than once, for example by repeatedly attempting and failing to touch a certain portion of the screen to provide a corresponding input. Further, different users can repeatedly make certain input errors that other users do not. As such, there remains an opportunity for improved input devices that can reduce input errors by adapting characteristics of the input device to particular users.

DESCRIPTION OF EXAMPLE EMBODIMENTS

Figure 1:
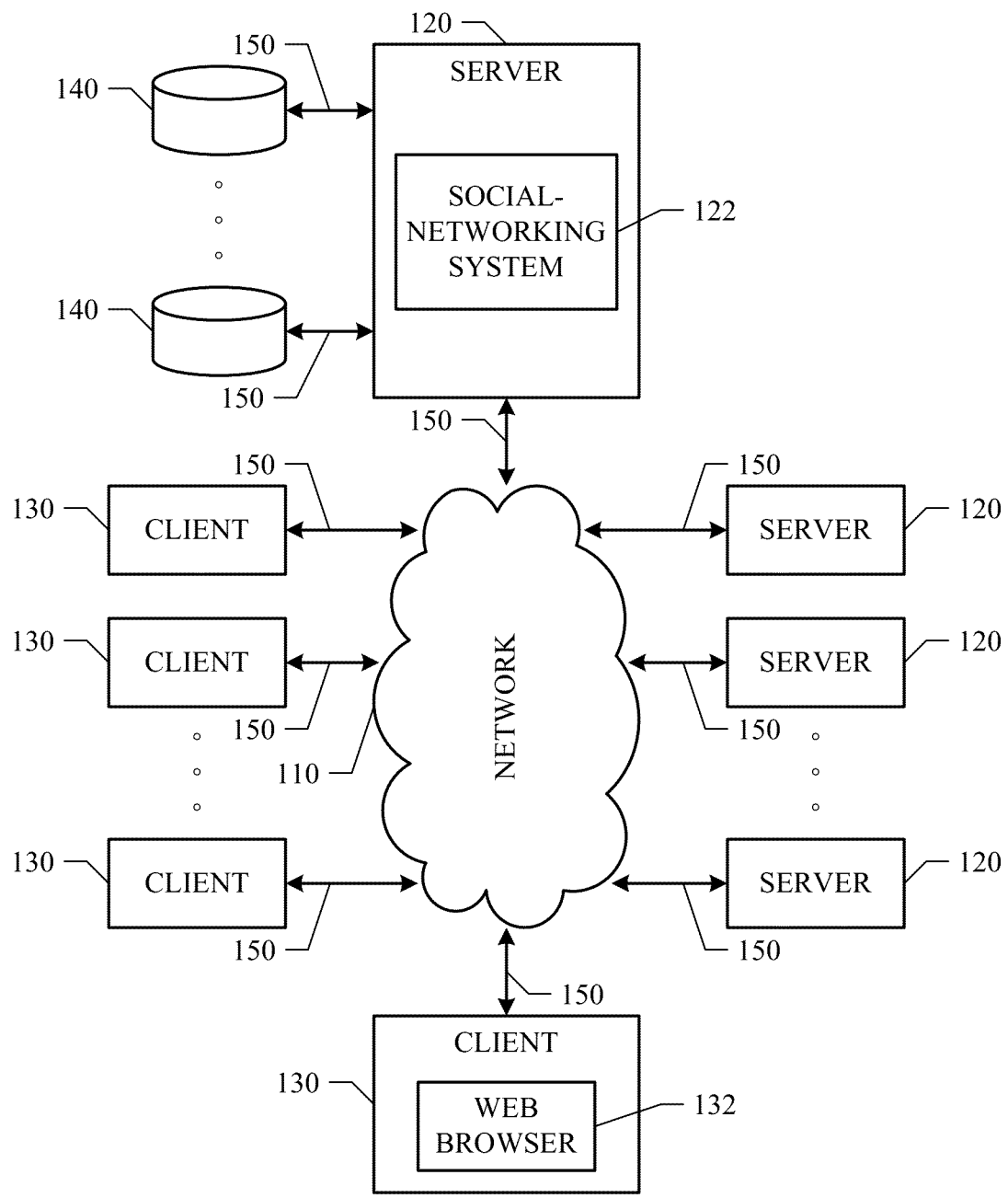
FIG. 1 illustrates an example network architecture for use with the disclosed subject matter.

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter is related to a method including detecting one or more user interactions, associated with a user of a computing device, each interaction occurring at a region associated with an input value, determining, using one or more processors, for at least one user interaction, that the at least one user intended to provide a different input value, generating adaptation information for the at least one user based on the at least one user interaction, storing the adaptation information for the at least one user, detecting a user interaction at a region, and determining, using the one or more processors, the user's intended input value based on the user interaction and the adaptation information.

For example and as embodied herein, the user interaction can include one or more of a click, a double-click, a swipe, a gesture, use of a stylus, use of a remote control, use of a pointing device, a motion not directly making contact with the computing device, or any combination thereof. The user interaction can be detected using one or more of a touch-sensitive screen, a touch sensor, a virtual keyboard, an optical sensor, a motion sensor, or any combination thereof. The input value can include one or more of an alphanumeric character, a logogram, a pictogram, an ideogram, a mathematical symbol, a typographical symbol, an image, or any combination thereof. Furthermore, the region can include a starting location and an ending location.

In some embodiments, the determining can be based on user input correcting the input value. The determining can be based on a set of common typographical errors, and/or the determining can be based on a dictionary.

Furthermore and as embodied herein, the adaptation information may be generated based on a property of the user interaction. The property of the user interaction can include speed, force, angle, duration, number of contact points, distance, or any combination thereof. The adaptation information may also be generated based on a usage context of the computing device: whether the computing device is locked, being held by the user in a particular hand, being held by the user using both hands, being held by the user in a particular orientation, or whether settings of the computing device have been configured to change the display, or any combination thereof. Generating the adaptation information can include performing a comparison between the region associated with the detected input value and a region associated with the different input value.

In some embodiments, the adaptation information can be stored for a group of input values and/or for a particular type of input format. The adaptation information is stored on the computing device and/or can be stored on a computer server. The adaptation information can be stored in association with a user identifier for the at least one user, and in some embodiments, the computing device can be associated with more than one user.

In some embodiments, determining the user's intended input value can include remapping input values to specified regions based on the adaptation information. Additionally or alternatively, determining the user's intended input value can include updating a correction scheme for the input values based on the adaptation information. Furthermore and as embodied herein, the method can include retrieving adaptation information for the at least one user from a data store upon identification of the at least one user.

The disclosed subject matter is also related to a system including one or more processors and logic encoded in one or more computer-readable tangible storage media that, when executed by the one or more processors, is operable to detect one or more user interactions, associated with a user of a computing device, each user interaction occurring at a region associated with an input value, make a determination, using the one or more processors, for at least one user interaction, that the at least one user intended to provide a different input value, generate adaptation information for the at least one user based on the at least one user interaction, store the adaptation information for the at least one user, detect a user interaction at a region, and determine, using the one or more processors, the user's intended input value based on the user interaction and the adaptation information.

The disclosed subject matter is also related to one or more computer-readable non-transitory storage media embodying software that is operable when executed by one or more processors associated with one or more computer systems to detect one or more user interactions, associated with a user of a computing device, each user interaction occurring at a region associated with an input value, make a determination, using the one or more processors, for at least one user interaction, that the at least one user intended to provide a different input value, generate adaptation information for the at least one user based on the at least one user interaction, store the adaptation information for the at least one user, detect a user interaction at a region, and determine, using the one or more processors, the user's intended input value based on the user interaction and the adaptation information.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Particular embodiments relate to a social networking environment including a social networking system and related systems that include conventional stationary as well as mobile embodiments. A social networking system offers its users the ability to communicate and interact with other users of the social networking system. Users join the social networking system and then add connections to a number of other users to whom they desire to be connected. Once they are members of the social network, the users may interact with the social network itself, by viewing and posting images and video on their own page, or by using personal computing devices to view and post location-based social networking information.

In particular embodiments, a user may want to share their personal computing device with another user. Such an occasion may occur informally (e.g., a friend who lets a friend try out their device) or formally (e.g., trying out a device in a retail store). When the personal computing device utilizes software, e.g., an operating system and/or applications, that relies upon personal information (including not only confidential information, but also any user-specific, user-entered, or user-generated information) to provide a personalized experience, the personal computing device may need to shield such personal information belonging to one user from being viewed or accessed by another user. This may include not only the situation where personal information is stored on the device itself, but also situations where certain applications and/or the operating system have access to personal information stored remotely (e.g., email and communication applications, such as Gmail™ or Twitter™, social-networking applications, such as Facebook™ or LinkedIn®, online banking and e-commerce applications, or content-sharing applications, such as YouTube™ or Picasa™).

In particular embodiments, a primary user of a personal computing device can protect their personal information by indicating that they are about to share their device with a temporary user (e.g., by clicking a button or selecting a menu option). In particular embodiments, the personal computing device may be able to detect that the primary user is holding or viewing the device by using biometric identification technology; in such embodiments, the device may also be able to detect when the primary user has let go of the device, or is no longer viewing the device, or when another user is holding or viewing the device.

In particular embodiments, when the primary user indicates, either passively or actively, that they are about to share the device with a temporary user or have just handed the device to a temporary user, the device may take one or more actions to protect personal information: (1) the device may remove or disable access to content, applications, information, or other data for which a user must be authenticated and/or authorized (e.g., by logging out of a website, or by deleting cookies, or by disabling access to security certificates), (2) the device may remove or disable personal information stored on the device itself, and (3) the device may clear out any caches, logs, and/or other sources of information that may track actions taken by or events that occurred with respect to the primary user.

In particular embodiments, the device enables the primary user to send an invitation with or without a secure authorization code to a potential temporary user, who is then able to log in to the device using information in the invitation. In particular embodiments, once the invitation has been sent, the device pre-loads information associated with the potential temporary user, so as to provide a personalized experience once the potential temporary user logs in to the device.

In particular embodiments, the device enables sharing with an anonymous temporary guest user. In particular embodiments, the device can be configured as a public device intended for use by multiple temporary users. In particular embodiments, for anonymous guest users and/or for public use, the device displays a generic set of applications and content to allow such temporary users to "try out" features and functionality of the device.

FIG. 1 illustrates an example network environment 100. Network environment 100 includes a network 110 coupling one or more servers 120 and one or more clients 130 to each other. In particular embodiments, network 110 is an intranet, an extranet, a virtual private network (VPN), a local area network (LAN), a wireless LAN (WLAN), a wide area network (WAN), a metropolitan area network (MAN), a portion of the Internet, a cellular technology-based network, a satellite communications technology-based network, or another network 110 or a combination of two or more such networks 110. This disclosure contemplates any suitable network 110.

One or more links 150 couple a server 120 or a client 130 to network 110. In particular embodiments, one or more links 150 each includes one or more wireline, wireless, or optical links 150. In particular embodiments, one or more links 150 each includes an intranet, an extranet, a VPN, a LAN, a WLAN, a WAN, a MAN, a portion of the Internet, a cellular technology-based network, a satellite communications technology-based network, or another link 150 or a combination of two or more such links 150. This disclosure contemplates any suitable links 150 coupling servers 120 and clients 130 to network 110.

In particular embodiments, each server 120 may be a unitary server or a distributed server spanning multiple computers or multiple datacenters. Servers 120 may be of various types, such as, for example and without limitation, web server, news server, mail server, message server, advertising server, file server, application server, exchange server, database server, proxy server, another server suitable for performing functions and/or processes described herein, or any combination thereof. In particular embodiments, each server 120 may include hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host HTML files or other file types, or may dynamically create or constitute files upon a request, and communicate them to clients 130 in response to HTTP or other requests from clients 130. A mail server is generally capable of providing electronic mail services to various clients 130. A database server is generally capable of providing an interface for managing data stored in one or more data stores. In particular embodiments, a social-networking system 122 may be hosted on a server 120.

In particular embodiments, one or more data storages 140 may be communicatively linked to one or more severs 120 via one or more links 150. In particular embodiments, data storages 140 may be used to store various types of information. In particular embodiments, the information stored in data storages 140 may be organized according to specific data structures. In particular embodiments, each data storage 140 may be a relational database. Particular embodiments may provide interfaces that enable servers 120 or clients 130 to manage, e.g., retrieve, modify, add, or delete, the information stored in data storage 140.

In particular embodiments, each client 130 may be an electronic device including hardware, software, or embedded logic components or a combination of two or more such components and capable of carrying out the appropriate functionalities implemented or supported by client 130. For example and without limitation, a client 130 may comprise a computer system such as: a desktop computer, a notebook or laptop, a netbook, a tablet, an e-book reader, a GPS device, a camera, a personal digital assistant (PDA), a handheld electronic device, a mobile telephone, or another similar processor-based electronic device. This disclosure contemplates any suitable clients 130. A client 130 may enable a network user at client 130 to access network 130. A client 130 may enable its user to communicate with other users at other clients 130. In particular embodiments, a client device 130 may comprise a personal computing device 200 as described in FIGS. 2A and 2B.

A client 130 may have a web browser 132, such as MICROSOFT® INTERNET EXPLORER®, GOOGLE CHROME™ or MOZILLA FIREFOX®, and may have one or more add-ons, plug-ins, or other extensions, such as TOOLBAR or YAHOO TOOLBAR®. A user at client 130 may enter a Uniform Resource Locator (URL) or other address directing the web browser 132 to a server 120, and the web browser 132 may generate a Hyper Text Transfer Protocol (HTTP) request and communicate the HTTP request to server 120. Server 120 may accept the HTTP request and communicate to client 130 one or more Hyper Text Markup Language (HTML) files responsive to the HTTP request. Client 130 may render a web page based on the HTML files from server 120 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT®, JAVA®, MICROSOFT® SILVERLIGHT®, combinations of markup language and scripts such as AJAX (Asynchronous JAVASCRIPT® and XML), and the like. Herein, reference to a web page encompasses one or more corresponding web page files (which a browser may use to render the web page) and vice versa, where appropriate.

FIG. 2A illustrates an example personal computing device 200. In particular embodiments, personal computing device 200 may comprise a processor 210, a memory 220, a communication component 230 (e.g., antenna and communication interface for wireless communications), one or more input and/or output (I/O) components and/or interfaces 240, and one or more sensors 250. In particular embodiments, one or more I/O components and/or interfaces 240 may incorporate one or more sensors 250. In particular embodiments, personal computing device 200 may comprise a computer system or and element thereof as described in FIG. 7 and associated description.

In particular embodiments, a personal computing device, such as a computing device, may include various types of sensors 250, such as, for example and without limitation: touch sensors (disposed, for example, on a display of the device, the back of the device and/or one or more lateral edges of the device) for detecting a user touching the surface of the mobile electronic device (e.g., using one or more fingers); accelerometer for detecting whether the personal computing device 200 is moving and the speed of the movement; thermometer for measuring the temperature change near the personal computing device 200; proximity sensor for detecting the proximity of the personal computing device 200 to another object (e.g., a hand, desk, or other object); light sensor for measuring the ambient light around the personal computing device 200; imaging sensor (e.g., camera) for capturing digital still images and/or video of objects near the personal computing device 200 (e.g., scenes, people, bar codes, QR codes, etc.); location sensors (e.g., Global Positioning System (GPS)) for determining the location (e.g., in terms of latitude and longitude) of the mobile electronic device; sensors for detecting communication networks within close proximity (e.g., near field communication (NFC), Bluetooth, RFID, infrared); chemical sensors; biometric sensors for biometrics-based (e.g., fingerprint, palm vein pattern, hand geometry, iris/retina, DNA, face, voice, olfactory, sweat) authentication of user of personal computing device 200; etc. This disclosure contemplates that a mobile electronic device may include any applicable type of sensor. Sensors may provide various types of sensor data, which may be analyzed to determine the user's intention with respect to the mobile electronic device at a given time.

In particular embodiments, a sensors hub 260 may optionally be included in personal computing device 200. Sensors 250 may be connected to sensors hub 260, which may be a low power-consuming processor that controls sensors 250, manages power for sensors 250, processes sensor inputs, aggregates sensor data, and performs certain sensor functions. In addition, in particular embodiments, some types of sensors 250 may be connected to a controller 270. In this case, sensors hub 260 may be connected to controller 270, which in turn is connected to sensor 250. Alternatively, in particular embodiments, there may be a sensor monitor in place of sensors hub 260 for managing sensors 250.

In particular embodiments, in addition to the front side, personal computing device 200 may have one or more sensors for performing biometric identification. Such sensors may be positioned on any surface of personal computing device 200. In example embodiments, as the user's hand touches personal computing device 200 to grab hold of it, the touch sensors may capture the user's fingerprints or palm vein pattern. In example embodiments, while a user is viewing the screen of personal computing device 200, a camera may capture an image of the user's face to perform facial recognition. In example embodiments, while a user is viewing the screen of personal computing device 200, an infrared scanner may scan the user's iris and/or retina. In example embodiments, while a user is in contact or close proximity with personal computing device 200, chemical and/or olfactory sensors may capture relevant data about a user. In particular embodiments, upon detecting that there is a change in state with respect to the identity of the user utilizing personal computing device 200, either by itself or in combination with other types of sensor indications, personal computing device 200 may determine that it is being shared.

In particular embodiments, in addition to the front side, the personal computing device 200 may have touch sensors on the left and right sides. Optionally, the personal computing device 200 may also have touch sensors on the back, top, or bottom side. Thus, as the user's hand touches personal computing device 200 to grab hold of it, the touch sensors may detect the user's fingers or palm touching personal computing device 200. In particular embodiments, upon detecting that there is a change in state with respect to a user touching personal computing device 200, either by itself or in combination with other types of sensor indications, personal computing device 200 may determine that it is being shared.

In particular embodiments, personal computing device 200 may have an accelerometer in addition to or instead of the touch sensors on the left and right sides. Sensor data provided by the accelerometer may also be used to estimate whether a new user has picked up personal computing device 200 from a resting position, e.g., on a table or desk, display shelf, or from someone's hand or from within someone's bag. When the user picks up personal computing device 200 and brings it in front of the user's face, there may be a relatively sudden increase in the movement speed of personal computing device 200. This change in the device's movement speed may be detected based on the sensor data supplied by the accelerometer. In particular embodiments, upon detecting that there is a significant increase in the speed of the device's movement, either by itself or in combination with other types of sensor indications, personal computing device 200 may determine that it is being shared.

In particular embodiments, personal computing device 200 may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of personal computing device 200. When personal computing device 200 is stored on a shelf or in the user's bag, it may stay mostly in one orientation. However, when the user grabs hold of personal computing device 200 and lifts it up and/or moves it closer to bring it in front of the user's face, there may be a relatively sudden change in the orientation of personal computing device 200. The orientation of personal computing device 200 may be detected and measured by the gyrometer. If the orientation of personal computing device 200 has changed significantly. In particular embodiments, upon detecting that there is a significant change in the orientation of personal computing device 200, either by itself or in combination with other types of sensor indications, personal computing device 200 may determine that it is being shared.

In particular embodiments, personal computing device 200 may have a light sensor. When personal computing device 200 is stored in a user's pocket or case, it is relatively dark around personal computing device 200. On the other hand, when the user brings personal computing device 200 out of his pocket, it may be relatively bright around personal computing device 200, especially during day time or in well-lit areas. The sensor data supplied by the light sensor may be analyzed to detect when a significant change in the ambient light level around personal computing device 200 occurs. In particular embodiments, upon detecting that there is a significant increase in the ambient light level around personal computing device 200, either by itself or in combination with other types of sensor indications, personal computing device 200 may determine that it is being shared.

In particular embodiments, personal computing device 200 may have a proximity sensor. The sensor data supplied by the proximity sensor may be analyzed to detect when personal computing device 200 is in close proximity to a specific object, such as the user's hand. For example, computing device 200 may have an infrared LED (light-emitting diode) 290 (i.e., proximity sensor) placed on its back side. When the user holds such a computing device in his hand, the palm of the user's hand may cover infrared LED 290. As a result, infrared LED 290 may detect when the user's hand is in close proximity to computing device 200. In particular embodiments, upon detecting that personal computing device 200 is in close proximity to the user's hand, either by itself or in combination with other types of sensor indications, personal computing device 200 may determine that it is being shared.

A personal computing device 200 may have any number of sensors of various types, and these sensors may supply different types of sensor data. Different combinations of the individual types of sensor data may be used together to detect and estimate a user's current intention with respect to personal computing device 200 (e.g., whether the user really means to take personal computing device 200 out of his pocket and use it). Sometimes, using multiple types of sensor data in combination may yield a more accurate, and thus better, estimation of the user's intention with respect to personal computing device 200 at a given time than only using a single type of sensor data. Nevertheless, it is possible to estimate the user's intention using a single type of sensor data (e.g., touch-sensor data).

Figure 2:
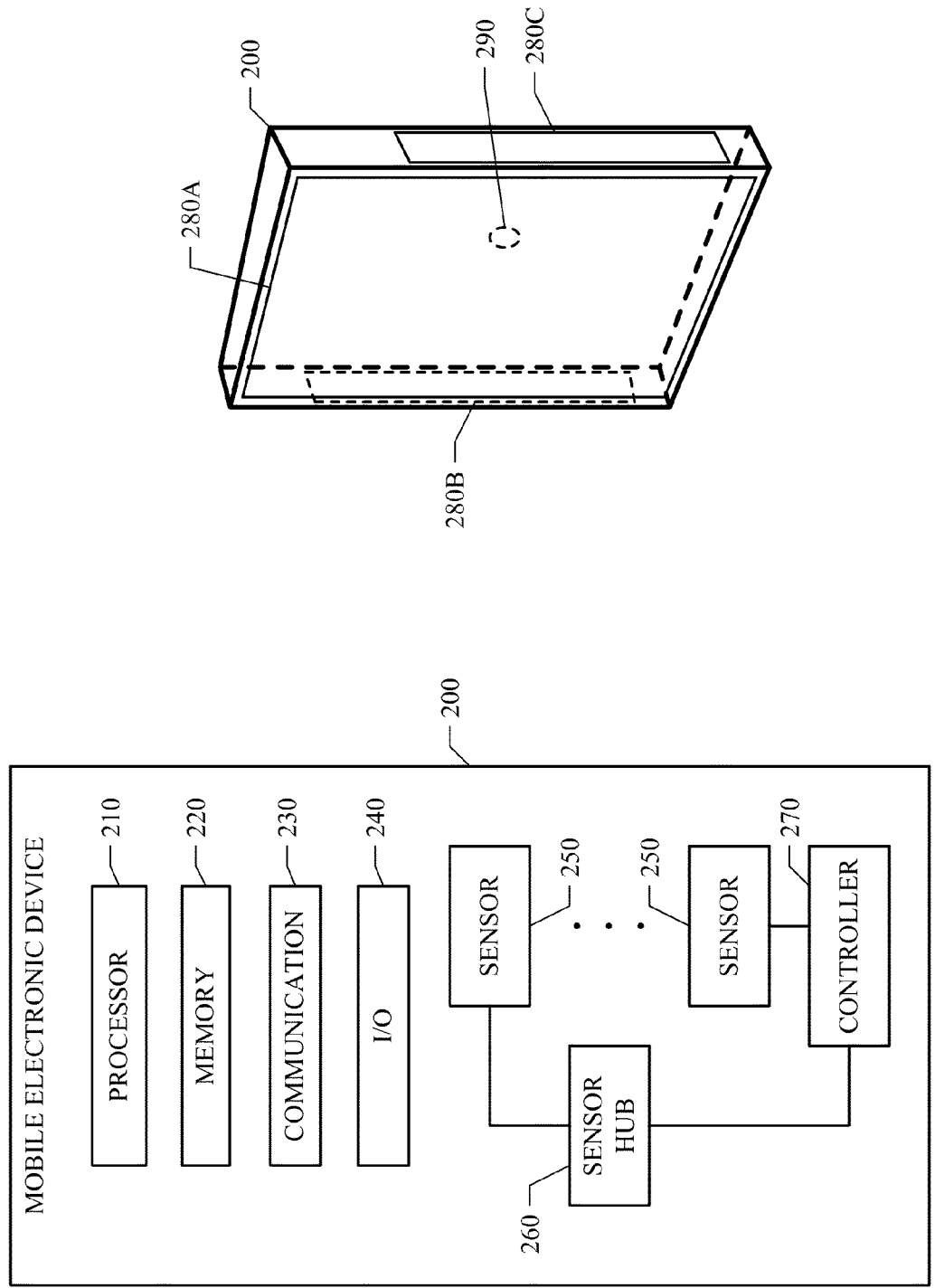
FIGS. 2A-2B illustrate an example personal computing device for use with the disclosed subject matter.

FIG. 2B illustrates the exterior of an example personal computing device 200. Personal computing device 200 has approximately six sides: front, back, top, bottom, left, and right. Touch sensors may be placed anywhere on any of the six sides of personal computing device 200. For example, in FIG. 2, a touch screen incorporating touch sensors 280A is placed on the front of personal computing device 200. The touch screen may function as an input/output (I/O) component for personal computing device 200. In addition, touch sensors 280B and 280C are placed on the left and right sides of personal computing device 200, respectively. Touch sensors 280B and 280C may detect a user's hand touching the sides of personal computing device 200. In particular embodiments, touch sensors 280A, 280B, 280C may be implemented using resistive, capacitive, and/or inductive touch sensors. The electrodes of the touch sensors 280A, 280B, 280C may be arranged on a thin solid piece of material or a thin wire mesh. In the case of capacitive touch sensors, there may be two types of electrodes: transmitting and receiving. These electrodes may be connected to a controller (e.g., controller 270 illustrated in FIG. 2), which may be a microchip designed to drive the transmitting electrodes with electrical pulses and measure the changes in capacitance from the receiving electrodes caused by a user's touches in order to detect the locations of the user touches.

Of course, personal computing device 200 is merely an example. In practice, a device may have any number of sides, and this disclosure contemplates devices with any number of sides. The touch sensors may be placed on any side of a device.

In particular embodiments, personal computing device 200 may have a proximity sensor 290 (e.g., an infrared LED) placed on its back side. Proximity sensor 290 may be able to supply sensor data for determining its proximity, and thus the proximity of personal computing device 200, to another object.

Figure 3:
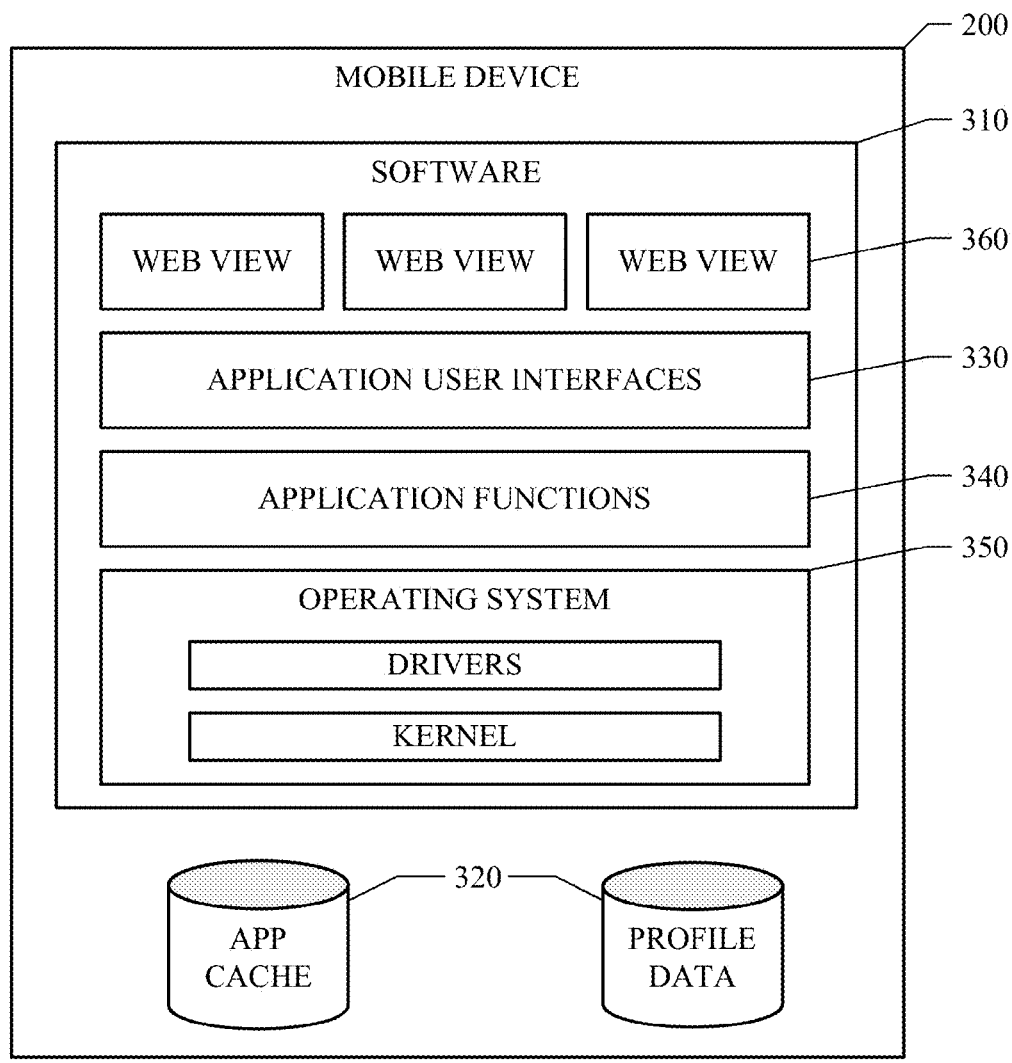
FIG. 3 illustrates an example software architecture for information and applications on a personal computing device for use with the disclosed subject matter.

FIG. 3 illustrates an example software architecture 300 for information and applications on a personal computing device 200. In particular embodiments, software architecture 300 may comprise software 310 and data store(s) 320. In particular embodiments, personal information may be stored in an application data cache 320 and/or a profile data store 320 and/or another data store 320. In particular embodiments, one or more software applications may be executed on personal computing device 200. In particular embodiments, they may be web-based applications hosted on servers. For example, a web-based application may be associated with a URI (Uniform Resource Identifier) or URL (Uniform Resource Locator). From personal computing device 200, a user may access the web-based application through its associated URI or URL (e.g., by using a web browser). Alternatively, in other embodiments, they may be native applications installed and residing on personal computing device 200. Thus, software 310 may also include any number of application user interfaces 330 and application functions 340. For example, one application (e.g., Google Maps®) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using personal computing device 200; a fifth application may allow the device user to receive and initiate VoIP and/or cellular network calls, and so on. Each application has one or more specific functionalities, and the software (e.g., one or more software modules) implementing these functionalities may be included in application functions 340. Each application may also have a user interface that enables the device user to interact with the application, and the software implementing the application user interface may be included in application user interfaces 330. In particular embodiments, the functionalities of an application may be implemented using JavaScript®, Java®, C, or other suitable programming languages. In particular embodiments, the user interface of an application may be implemented using HyperText Markup Language (HTML), JavaScript®, Java®, or other suitable programming languages.

In particular embodiments, the user interface of an application may include any number of screens or displays. In particular embodiments, each screen or display of the user interface may be implemented as a web page. Thus, the device user may interact with the application through a series of screens or displays (i.e., a series of web pages). In particular embodiments, operating system 350 is Google's Android™ mobile technology platform. With Android®, there is a Java® package called "android.webkit", which provides various tools for browsing the web. Among the "android.webkit" package, there is a Java class called "android.webkit.WebView", which implements a View for displaying web pages. This class uses the WebKit rendering engine to display web pages and includes methods to navigate forward and backward through a history, zoom in, zoom out, perform text searches, and so on. In particular embodiments, an application user interface 330 may utilize Android's WebView application programming interface (API) to display each web page of the user interface in a View implemented by the "android.webkit.WebView" class. Thus, in particular embodiments, software 310 may include any number of web views 360, each for displaying one or more web pages that implement the user interface of an application.

During the execution of an application, the device user may interact with the application through its user interface. For example, the user may provide inputs to the application in various displays (e.g., web pages). Outputs of the application may be presented to the user in various displays (e.g., web pages) as well. In particular embodiments, when the user provides an input to the application through a specific display (e.g., a specific web page), an event (e.g., an input event) may be generated by, for example, a web view 360 or application user interfaces 330. Each input event may be forwarded to application functions 340, or application functions 340 may listen for input events thus generated. When application functions 340 receive an input event, the appropriate software module in application functions 340 may be invoked to process the event. In addition, specific functionalities provided by operating system 350 and/or hardware (e.g., as described in FIGS. 1 and 2A-B) may also be invoked. For example, if the event is generated as a result of the user pushing a button to take a photo with personal computing device 200, a corresponding image processing module may be invoked to convert the raw image data into an image file (e.g., JPG or GIF) and store the image file in the storage 320 of personal computing device 200. As another example, if the event is generated as a result of the user selecting an icon to compose an instant message, the corresponding short message service (SMS) module may be invoked to enable the user to compose and send the message.

In particular embodiments, when an output of the application is ready to be presented to the user, an event (e.g., an output event) may be generated by, for example, a software module in application functions 340 or operating system 350. Each output event may be forwarded to application user interfaces 330, or application user interfaces 330 may listen for output events thus generated. When application user interfaces 330 receive an output event, it may construct a web view 360 to display a web page representing or containing the output. For example, in response to the user selecting an icon to compose an instant message, an output may be constructed that includes a text field that allows the user to input the message. This output may be presented to the user as a web page and displayed to the user in a web view 360 so that the user may type into the text field the message to be sent.

The user interface of an application may be implemented using a suitable programming language (e.g., HTML, JavaScript®, or Java®). More specifically, in particular embodiments, each web page that implements a screen or display of the user interface may be implemented using a suitable programming language. In particular embodiments, when a web view 360 is constructed to display a web page (e.g., by application user interfaces 330 in response to an output event), the code implementing the web page is loaded into web view 360.

Figure 4:
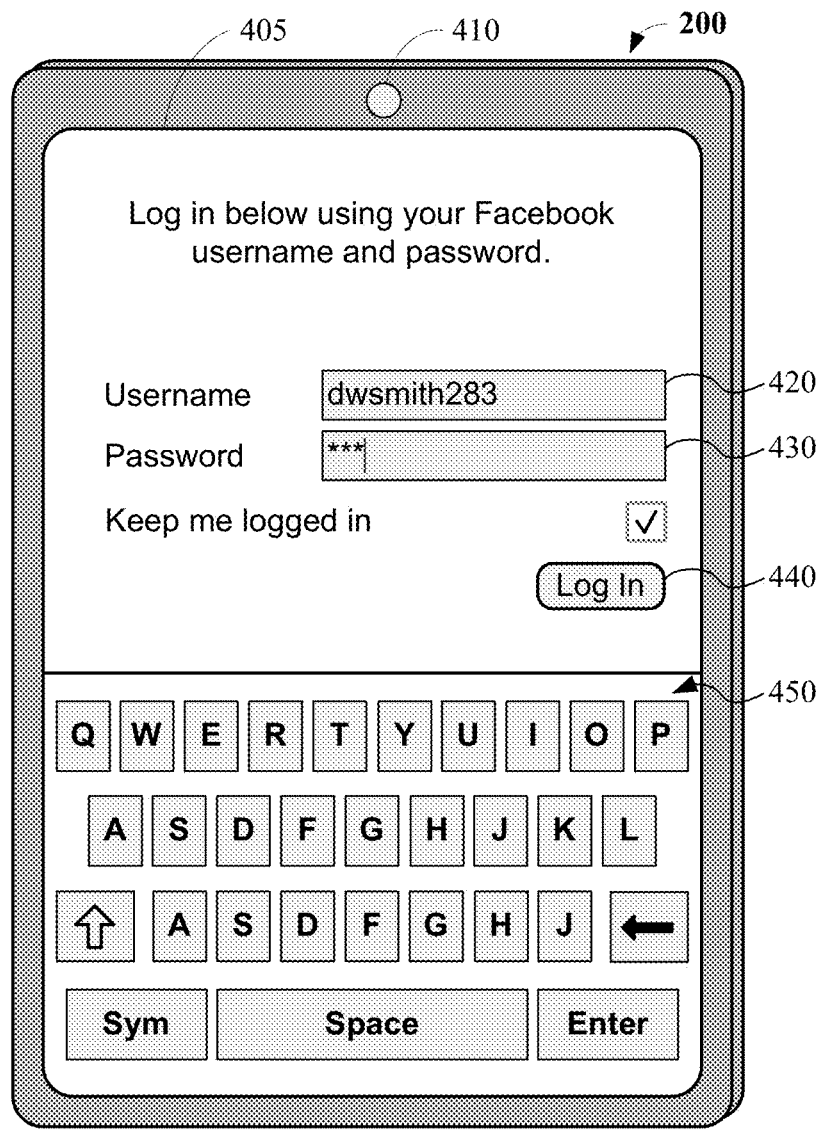
FIG. 4 illustrates an example wireframe of the personal computing device according to the disclosed subject matter.

FIG. 4 illustrates an example scenario in which a user provides input to the personal computing device. FIG. 4 shows an example personal computing device 200. In particular embodiments, personal computing device 400 includes a touch screen 405 and a sensor 410.

For example, as shown in FIG. 4, a user may wish to log in to web page using a personal computing device 200. A user can tap on the screen (or input another appropriate indication) to unlock the device, browse to a web page, and open up an interface for authentication/authorization where the user can log in. FIG. 4 illustrates an example user interface that appears on personal computing device 200 to log into a web page. In particular embodiments, a message displayed on personal computing device 200 invites the temporary user to enter their authorization information (e.g., a login interface for a username 420 and password 430). In particular embodiments, the user can indicate (e.g., by marking a checkbox) that they would like to, for example, keep being logged in by saving data related to their login on the personal computing device 200. In particular embodiments, when the temporary user clicks the "Log In" button 440 to log in, personal computing device 200 interacts with the web page to authenticate the user.

Figure 5A:
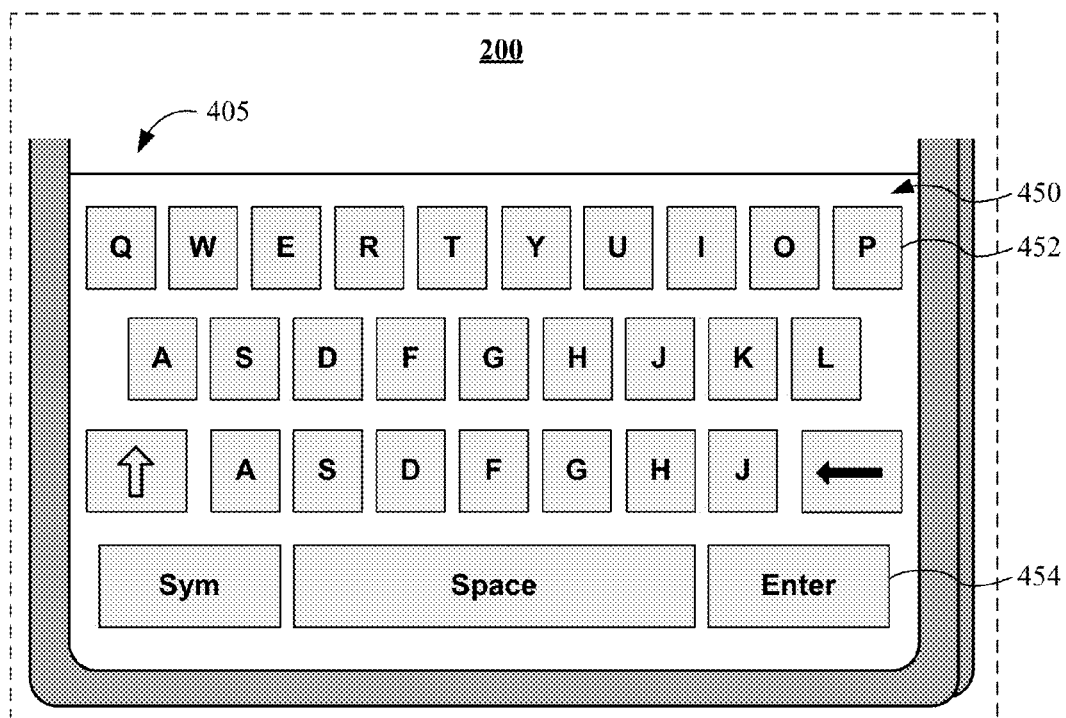
FIGS. 5A-5B illustrate example wireframes of the personal computing device illustrating an aspect of the disclosed subject matter.

In particular embodiments, some inputs can be performed by tapping or pressing on a certain region of the screen 405. For example, in FIG. 4, a user can select a field to edit by tapping field 420 to select the username field or field 430 to select the password field. As shown in FIG. 5A, to permit a user to input data into a field, for example when a field is selected, the personal computing device 200 can display a virtual keyboard 450 on the touch screen 405. The user can input data by tapping on the symbols of the virtual keyboard 450 to input corresponding letters, numbers, symbols, etc. For example, to input a letter 'P' into a field, the user can tap the region of the touch screen 405 marked as a box marked with a letter 'P' (i.e., the 'P' key 452). Similarly, to input a line break or the completion of an entry, the user can tap the 'Enter' key 454, marked as a box with the word 'Enter.'

A user can perform errors while inputting data using the touch screen 405. For example, while intending to touch the region of the 'P' key 452, a user instead can inadvertently touch an adjacent region of the touch screen 405. This can cause the user to notice the error and correct the input error, or can cause the personal computing device 200 to suggest a correction for a misspelled word. Users can repeatedly perform certain typing errors with detectable consistency. For example, when intending to select the 'P' key 452, a user can instead have a tendency to touch a region of the screen several coordinates away from the 'P' key 452.

Figure 5B:
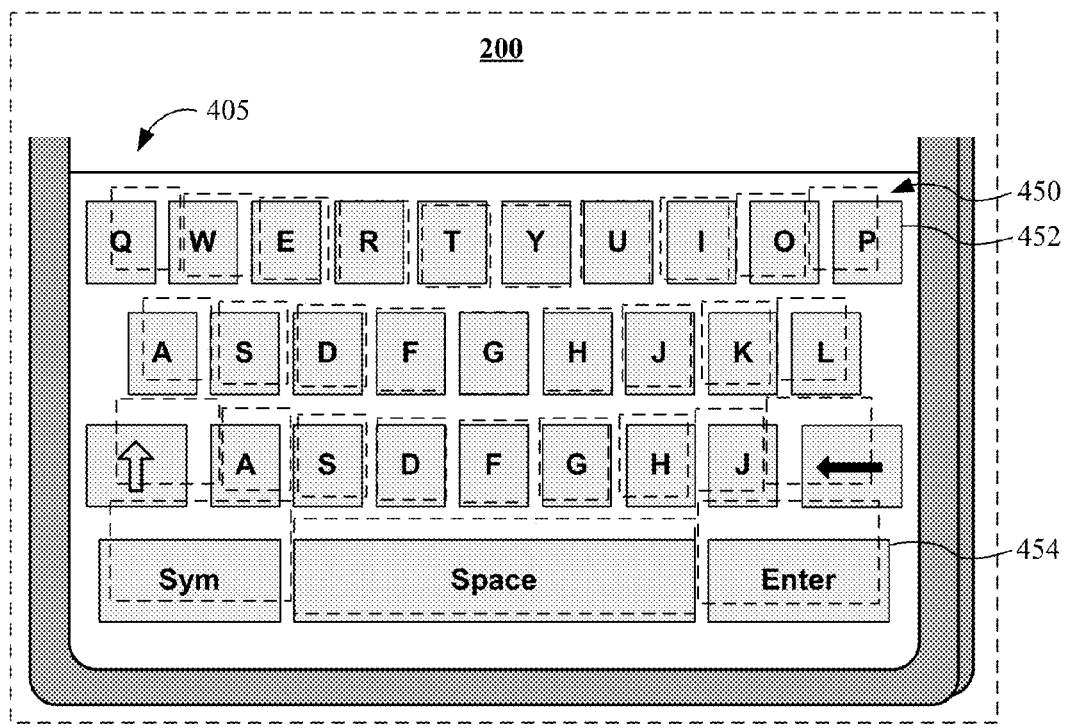

According to one aspect of the disclosed subject matter, a personal computing device 200 can adapt the virtual keyboard 450 to compensate for the user's tendency to touch the incorrect region. For example, as shown in FIG. 5B, the personal computing device 200 can adjust the position of where the 'P' key 452 is sensed several coordinates in the x- and y-directions of the touch screen 405 to compensate for the user's tendency to incorrectly tap the 'P' key 452. Additionally, different users can have different tendencies for input errors. For example, a different user can tend to tap the 'P' key correctly, but can tend to tap the 'Enter' key 454 incorrectly. Accordingly, the personal computing device 200 can adjust the position of where certain keys are sensed for each particular user to compensate for the unique tendencies of each user, as discussed in further detail below with reference to the diagram of FIG. 6.

Figure 6:
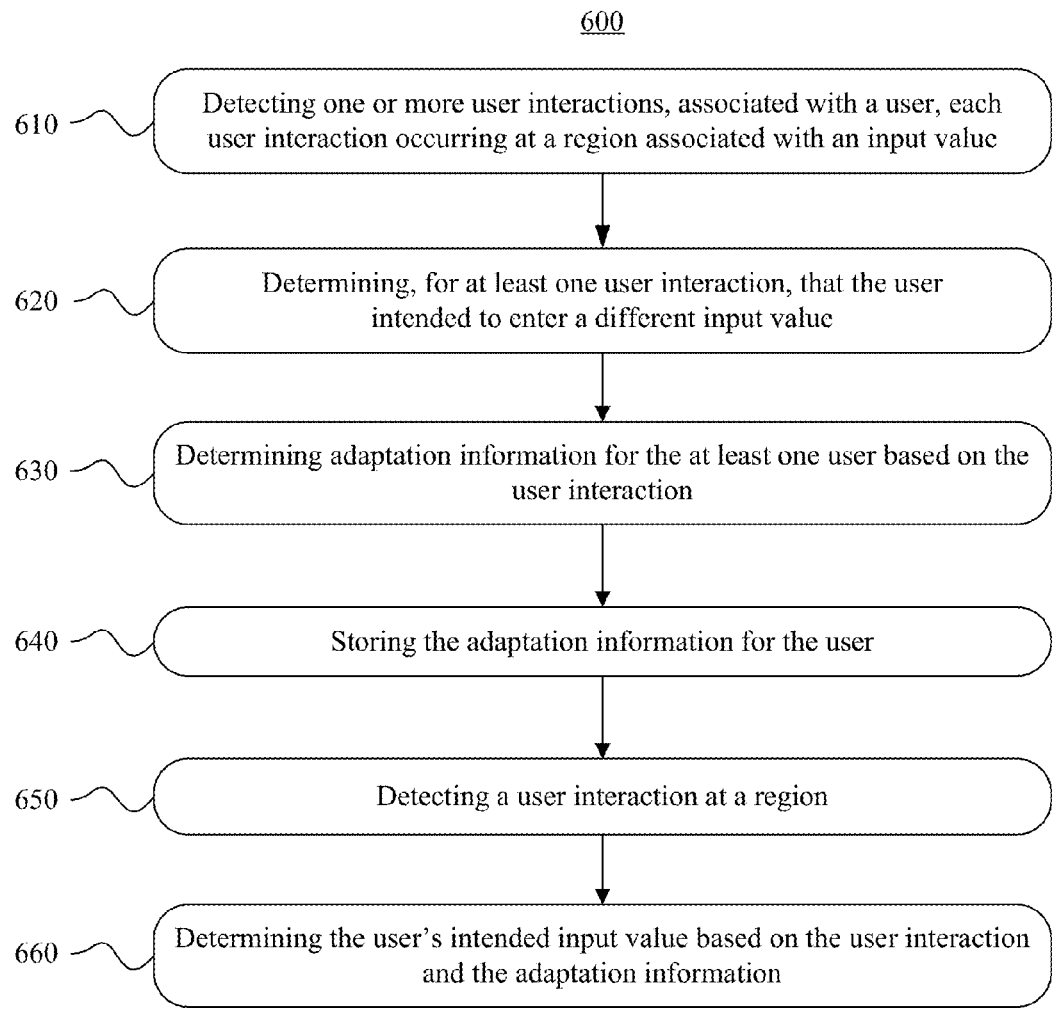
FIG. 6 illustrates an exemplary method according to one aspect of the disclosed subject matter.

FIG. 6 illustrates an exemplary method for a user-adaptable keyboard according to the disclosed subject matter. At 610, device 200 detects one or more user interactions associated with a user of device 200, each interaction occurring at a region associated with an input value. For example, as described above, one such user interaction can be to select a field by touching the region of touch screen 405 associated with the username field 420 or password field 430. Another interaction can be to input a value into a field, for example by tapping the region of touch screen 405 associated 'P' key 452. Yet another interaction can be to press a button, for example by touching the region of touch screen 405 associated with the "Log In" button 440. Other interactions can include, for example and without limitation, selecting an item from a drop-down menu, activating a program using a program icon, selecting a date in a calendar application, scrolling down in a page, or any other suitable interaction.

Certain interactions can be performed by touching a particular region or regions of touch screen 405. For example, a user interaction can include a single tap, or click of a region, or a double tap or double click of a region. The user interaction can include a swipe, for example by touching across a region of the touch screen 405 in a sweeping manner, or a gesture, for example by touching a region of the touch screen 405 in a predetermined pattern.

For purpose of illustration and not limitation, and as embodied herein, interactions can performed by touching the touch screen 405. However, other interactions can be performed using other forms of input. For example, a user interaction can be performed by pressing a stylus to a region of the screen, or by moving a pointer to a particular region of a screen, such as by using a mouse, trackball, trackpad, or other pointing device. Further, interactions can be performed directly, or can be performed remotely, for example by using a remote control. Such interactions can also be performed by a motion not directly making contact with device 200, or with any other device. In this manner, a motion can be captured by sensor 410, which can be an optical sensor or motion sensor, for example a video camera, and the motion can be determined by device 200 to be a user interaction.

Each user interaction detected by device 200 is associated with a particular input value. For example, as described above, the user interaction of tapping the 'P' key 452 can correspond to the input value of the letter 'P'. In addition to such alphanumeric characters, an input value can include a logogram, a pictogram, an ideogram, a mathematical symbol, a typographical symbol, an image, or any combination thereof.

A region can be defined as a single location. For example, the 'P' key 452 can be selected by tapping in the location of the touch screen 405 indicated by the 'P' key 452. Additionally or alternatively, a region can be defined as two or more locations. That is, some regions can be selected by touching from one location to another location, for example by selecting and dragging an icon from one location on the touch screen 405 to another location, or by touching more than one location on the touch screen 405 in a particular pattern.

At 620, device 200 determines, for at least one user interaction, that the user intended to provide a different input value. For example, as embodied herein, this can occur when the user intends to select a region of touch screen 405, but inadvertently selects another region of touch screen 405. The inadvertent selection of a region can be considered to be an input error by the user, and the inadvertently selected region can be, but is not necessarily, adjacent and proximate to the intended region.

Device 200 can determine that the user intended to provide a different input value based on input provided by the user to correct an entered input value. For example, a user can type a first character into a field, and then can erase the first character and replace it with a second character. Based on the correction, device 200 can determine that the first character was the result of an input error, and that the user intended to provide the second character. Additionally or alternatively, device 200 can detect an input error without the user correcting an entered value. For example, device 200 can recognize a word entered in an input field is incorrect based on a set of common typographical errors or a dictionary. That is, if a user inputs a word or value in the list of common typographical errors, device 200 can determine that the user intended to provide a corresponding correct input. Likewise, if a user inputs a word or value that is not in a dictionary, device 200 can determine that the user intended to provide a closely-matching input in the dictionary. Additionally, device 200 can provide a prompt to the user to notify that an incorrect word or value has been input, and can suggest alternative inputs for the user to select.

In particular embodiments, device 200 can determine that the user intended to provide a different input value based on a typeahead predictive algorithm. In an exemplary typeahead predictive algorithm, a user can input a first set of characters, for example "wei", into a field, such as an internet search field. Based on the first set of characters, a frontend typeahead process can determine and display names of matching entries (e.g., an entry named "weight lifting"), which the user can then click on or otherwise select thereby confirming the desire to declare the matched entry corresponding to the user's input. By way of example, upon clicking "weight lifting," the frontend typeahead process auto-populates, or causes the web browser to auto-populate, the field with the declaration "weight lifting." Alternatively, the frontend typeahead process can auto-populate the field with the name or other identifier of the top-ranked match rather than display a drop-down menu, and the user can confirm the auto-populated declaration by keying "enter" on his or her keyboard or by clicking on the auto-populated declaration. Based on the typeahead predictive algorithm, device 200 can determine that a user intended to provide a different input value. For example, if the typeahead predictive algorithm populates the field with an entry having a first set of characters different from the first set of characters entered by the user, device 200 can determine that the user intended to enter the first set of characters of the populated entry.

At 630, device 200 generates adaptation information for the at least one user based on the user interaction. The adaptation information can be generated by performing a comparison between the region associated with the detected input value and a region associated with the different input value. For example, as described above, device 200 can determine that the user intended to touch the region corresponding to the 'P' key 452, when actually the user touched the region corresponding to the 'O' key. By comparing the region associated with the detected input value, the 'O' key in this example, with the different or intended input value, the 'P' key 452 in this example, device 200 can generate adaptation information based on a comparison of the two regions. That is, device 200 can recognize that the region corresponding to the 'O' key is −2 coordinates in the x-direction from the region corresponding to the 'P' key 452. In this manner, device 200 can generate adaptation information, for example, that indicates the user touched 2 coordinates to the left of the 'P' key 452 when the user intended to touch the 'P' key 452 region.

The adaptation information can be generated each instance that an input error is made, and statistical analysis of the adaptation information, such as frequency or magnitude of particular errors, can be performed. For example, device 200 can recognize that the user made an input error in 3 out of 5 attempts to touch the 'P' key 452, and that the user missed the region corresponding to the 'P' key 452 on average by +2 coordinates in the x-direction and +3 coordinates in the y-direction.

In particular embodiments, the adaptation information can be generated for the user based on a property of the user interaction. A property of the user interaction can include, for example, speed. That is, the adaptation information can indicate that the user makes a particular error, or makes a particular more frequently or with a greater magnitude, when the user is typing at or above a threshold speed. Another property of the user interaction can include, for example, force. That is, device 200 can detect that a region of the touch screen 405 was pressed at or above a threshold force, and can generate adaptation information indicating that the user made a particular error while touching the touch screen 405 at or above the threshold force. Another property of the user interaction can include, for example, an angle of input. That is, device 200 can detect that a region of the touch screen 405 was touched at a certain angle, and can generate adaptation information indicating that the user made a particular error while touching the touch screen 405 at the certain angle. Another property of the user interaction can include, for example, a duration of input. That is, device 200 can detect that a region of the touch screen 405 was touched for a certain duration, and can generate adaptation information indicating that the user made a particular error while touching the touch screen 405 for the certain duration. Another property of the user interaction can include, for example, a number of contact points. That is, a region associated with a particular input value can have more than one location to be touched, and device 200 can generate adaptation information indicating that the user made an error inputting the particular input value having a region with more than one location. The adaptation information generated by device 200 can include any combination of the properties of the user interaction described above, or any other suitable properties.

In particular embodiments, the adaptation information can be generated for the user based on other factors. For example, the adaptation information can be generated for the user indicating whether device 200 is docked. The adaptation information can be generated indicating that device 200 is being held by the user in a particular hand, or being held by the user using both hands. Further, the adaptation information can be generated indicating that device 200 is being held by the user in a particular orientation, for example in a portrait or landscape orientation. Additionally, the adaptation information can be generated indicating that settings have been configured to change the display, for example to a certain brightness level or to a particular international language setting. The adaptation information generated by device 200 can include information about any combination of the factors described above, or any other suitable factors.

At 640, device 200 stores or causes the adaptation information for the user to be stored. The adaptation information can be organized in various ways. For example, the adaptation information can be stored for a particular input value. That is, device 200 can determine the user performed multiple input errors while intending to enter the letter 'P', and can store the adaptation information for each of these errors associated with the region corresponding to the 'P' key 452. Similarly, the adaptation information can be stored for a group of input values. For example, device 200 can determine the user performed multiple input errors while intending to enter the word 'friend', and can store the adaptation information for each of these errors associated with the group of input values corresponding to the word 'friend'. Additionally or alternatively, the adaptation information can be stored for a particular type of input format. For example, device 200 can determine the user performed multiple input errors while intending to select various program icons, and can store the adaptation information for each of these errors associated with the input format of 'program icons.'

In particular embodiments, the adaptation information can be stored in association with a user identifier for the at least one user. In this embodiment, device 200 can be associated with more than one user, for example by defining a user profile associated with each user. In this manner, device 200 can recognize which of the users is using device 200, either automatically, for example, by sensing the user, or by requiring each user to log in to their corresponding user profile before using device 200. As such, device 200 can recognize which user has made a particular input error, and can store the corresponding adaptation information in association with the particular user.

The adaptation information can be stored in one or more locations. For example, the adaptation information can be stored on device 200 itself. Additionally or alternatively, device 200 can store the adaptation information on a computer server in communication with device 200.

At 650, device 200 detects a user interaction at a region. For example, device 200 can detect the user interaction as described above with respect to 610, or in any other suitable manner.

At 660, device 200 determines the user's intended input value based on the user interaction detected in 650 and the adaptation information. In particular embodiments, determining the user's intended input value can include remapping input values to specified regions based on the adaptation information. For example and not limitation, as described above with respect to 630, device 200 can generate adaptation information indicating that the last 20 times a user intended to touch the 'P' key 452, which is located, for example, at a coordinate identified as 30, 45 in the x,y plane of touch screen 405, the user actually touched a coordinate identified as 32, 48. Accordingly, device 200 can remap the 'P' key 452 by moving the region corresponding to where the 'P' key 452 is sensed by +2 coordinates in the x-direction (i.e., 32−30) and +3 coordinates in the y-direction (i.e., 48−45). In this manner, at 650, device 200 detects the user touches the coordinate 32, 48, and in 660 device 200 can determine the user's intended input correctly as the letter 'P'.

The remapping can change the coordinates of the 'P' key 452 as it is detected by device 200 without changing the location of the 'P' key 452 as displayed on the touch screen 405. Alternatively, the remapping can be performed by changing the location of the 'P' key 452 as displayed on the touch screen 405 (however, this may possibly result in a visually assymetric or disorganized keyboard). FIG. 5B illustrates the remapping of the areas where several keys of virtual keyboard 450 are sensed. In this embodiment, the keys would continue to be displayed as shown in FIG. 5A, but the regions corresponding to the keys would be remapped to the coordinates shown in phantom in FIG. 5B.

In particular embodiments, determining the user's intended input value can include updating a correction scheme for the input values based on the adaptation information. This can occur, for example, if device 200 is not configured to remap the coordinates of the virtual keyboard 450. Instead, a correction scheme can be implemented, for example as a separate software component. As such, and with reference to the example above, device 200 can update the correction scheme with the adaptation information indicating that the last 20 times a user intended to touch the 'P' key 452, the user actually touched the coordinate identified as 32, 48. Accordingly, at 650, device 200 detects the user touches coordinate 32, 48, and at 660, the correction scheme can recognize that the user's intended input was the 'P' key 452 and provide the user's intended input value to device 200.

Determining the user's intended input value, for example by remapping input values or updating the correction scheme, can be performed based on any of the properties of user interaction or other factors included in the adaptation information. For example, if device 200 determines that a particular error is made when the user is typing at or above a threshold speed, the input values can be remapped or the correction scheme can be updated to correct an input only when the user is typing at or above the threshold speed. Similarly, if device 200 determines that a particular error is made when the user is typing in a landscape orientation, the input values can be remapped or the correction scheme can be updated to correct an input only when the user is typing in the landscape orientation.

In particular embodiments, device 200 can retrieve adaptation information for the at least one user from a data store upon identification of the at least one user. As described above, device 200 can be associated with more than one user, and as such, when a particular user is identified to be using device 200, adaptation information for the particular user can be retrieved. In this manner, intended input values from each detected user interaction can be determined based on the adaptation information corresponding to the particular user.

Figure 7:
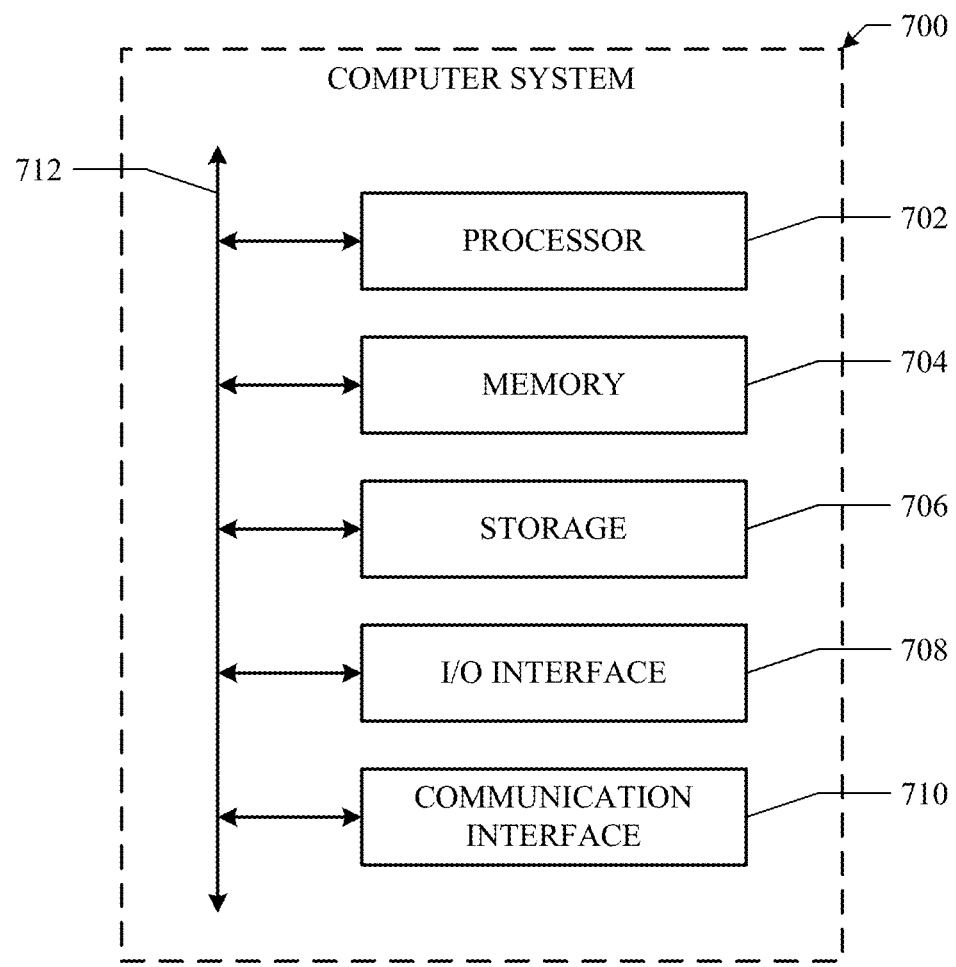
FIG. 7 illustrates an example computer system according to one aspect of the disclosed subject matter.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple datacenters; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 02 to memory 704. Bus 712 may include one or more memory buses, as described below. In particular embodiments, one or more memory management units (MMUs) reside between processor 702 and memory 704 and facilitate accesses to memory 704 requested by processor 702. Although this disclosure describes and illustrates particular memory, this disclosure contemplates any suitable memory.

In particular embodiments, storage 706 includes mass storage for data or instructions. Storage 706 may include removable or non-removable (i.e., fixed) media, where appropriate. Storage 706 may be internal or external to computer system 700, where appropriate. In particular embodiments, storage 706 is non-volatile, solid-state memory. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 710 for it. Although this disclosure describes and illustrates a particular communication interface, this disclosure contemplates any suitable communication interface.

In particular embodiments, bus 712 includes hardware, software, or both coupling components of computer system 700 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the disclosed subject matter even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The disclosed subject matter has been explained with reference to specific embodiments. For example, while embodiments of the disclosed subject matter have been described as operating in connection with a social network system, the disclosed subject matter can be used in connection with any communications facility that allows for communication of messages between users, such as an email hosting site. Other embodiments will be evident to those of ordinary skill in the art. It is therefore not intended that the disclosed subject matter be limited, except as indicated by the appended claims.

Finally, the language used in the specification has been principally selected for readability and instructional purposes, and it may not have been selected to delineate or circumscribe the disclosed subject matter. It is therefore intended that the scope of the invention be limited not by this detailed description, but rather by any claims that issue on an application based hereon. Accordingly, the disclosure of the embodiments of the disclosed subject matter is intended to be illustrative, but not limiting, of the scope of the invention, which is set forth in the following claims.

What is claimed is:

1. A method comprising:
   receiving, by an input device of a computing device, one or more initial user interactions each associated with a user of the computing device, wherein each of the initial user interactions occurred at a respective region associated with an input value;
   determining, by one or more processors of the computing device, for at least one of the initial user interactions, that the associated user intended to provide a different input value;
   generating, by the one or more processors, adaptation information for the associated user based on the at least one initial user interaction, wherein the adaptation information is based on a brightness level of the computing device at the time of the initial user interaction and is further based on a property of the at least one initial user interaction, wherein the property of the at least one initial user interaction comprises speed, force, or angle;
   storing, by the one or more processors, the adaptation information in a user profile for the associated user;
   receiving, by the input device, at least one subsequent user interaction, wherein the subsequent user interaction is determined to have been entered by an identified user of the computing device for whom adaptation information is stored in a user profile for the identified user, and wherein the subsequent user interaction occurred at a region associated with an input value; and
   determining, by the one or more processors, an intended input value different from the input value associated with the region of the subsequent user interaction, the determining being based on a property of the subsequent user interaction and the adaptation information for the identified user, wherein the property of the subsequent user interaction comprises speed, force, or angle.

2. The method of claim 1, a user interaction comprising a click, a double-click, a swipe, a gesture, use of a stylus, use of a remote control, use of a pointing device, a motion not directly making contact with the computing device, or any combination thereof.

3. The method of claim 1, a user interaction being detected using at least one of a touch-sensitive screen, a touch sensor, a virtual keyboard, an optical sensor, a motion sensor, or any combination thereof.

4. The method of claim 1, an input value comprising an alphanumeric character, a logogram, a pictogram, an ideogram, a mathematical symbol, a typographical symbol, an image, or any combination thereof.

5. The method of claim 1, wherein a region associated with an input value comprises a starting location and an ending location.

6. The method of claim 1, wherein the determining that the associated user intended to provide a different input value is based on user input correcting the input value, a set of common typographical errors, a dictionary, or any combination thereof.

7. The method of claim 1, wherein the adaptation information is generated based on a property of one or more initial user interactions.

8. The method of claim 7, wherein a property of a user interaction further comprises a distance between a region associated with the intended input value and the region of the subsequent user interaction, or any combination thereof.

9. The method of claim 1, wherein the adaptation information is generated based on a usage context comprising: whether the computing device is locked, whether the computing device is being held by the associated user in a particular hand, whether the computing device is being held by the associated user using both hands, whether the computing device is being held by the associated user in a particular orientation, or any combination thereof.

10. The method of claim 1, wherein the generating the adaptation information comprises performing a comparison between the region associated with the received input value and a region associated with the different input value.

11. The method of claim 1, wherein the adaptation information is stored with respect to a group of input values.

12. The method of claim 1, wherein the adaptation information is stored with respect to a particular type of input format.

13. The method of claim 1, wherein the adaptation information is stored on the computing device, on a computer server, or any combination thereof.

14. The method of claim 1, wherein the computing device is associated with more than one user, and wherein respective adaptation information is stored in a user profile for each of the associated users.

15. The method of claim 1, wherein determining the intended input value comprises remapping input values to specified sensing regions based on the adaptation information for the identified user.

16. The method of claim 1, wherein determining the intended input value comprises updating a correction scheme for the input values based on the adaptation information for the identified user.

17. The method of claim 1, further comprising retrieving adaptation information for the identified user from a data store upon authentication of the identified user.

18. One or more computer-readable non-transitory storage media embodying software that is operable when executed to:
 receive, by an input device of a computing device, one or more initial user interactions each associated with a user of the computing device, wherein each of the initial user interactions occurred at a respective region associated with an input value;
 determine, by one or more processors of the computing device, for at least one of the initial user interactions, that the associated user intended to provide a different input value;
 generate, by the one or more processors, adaptation information for the associated user based on the at least one initial user interaction, wherein the adaptation information is based on a brightness level of the computing device at the time of the initial user interaction and is further based on a property of the at least one initial user interaction, wherein the property of the at least one initial user interaction comprises speed, force, or angle;
 store, by the one or more processors, the adaptation information in a user profile for the associated user;
 receive, by the input device, at least one subsequent user interaction, wherein the subsequent user interaction is determined to have been entered by an identified user of the computing device for whom adaptation information is stored in a user profile for the identified user, and wherein the subsequent user interaction occurred at a region associated with an input value; and
 determine, by the one or more processors, an intended input value different from the input value associated with the region of the subsequent user interaction, the determining being based on a property of the subsequent user interaction and the adaptation information for the identified user, wherein the property of the subsequent user interaction comprises speed, force, or angle.

19. The media of claim 18, wherein the determination that the associated user intended to provide a different input value is based on user input correcting the input value, a set of common typographical errors, a dictionary, or any combination thereof.

20. A system comprising:
an input device;
a display device;
one or more processors; and
a memory coupled to the processors comprising instructions executable by the processors, the processors operable when executing the instructions to:
 receive, by the input device, one or more initial user interactions each associated with a user of the computing device, wherein each of the initial user interactions occurred at a respective region associated with an input value;
 determine for at least one of the initial user interactions, that the associated user intended to provide a different input value;
 generate adaptation information for the associated user based on the at least one initial user interaction, wherein the adaptation information is based on a brightness level of the computing device at the time of the initial user interaction and is further based on a property of the at least one initial user interaction, wherein the property of the at least one initial user interaction comprises speed, force, or angle;
 store the adaptation information in a user profile for the associated user;
 receive, by the input device, at least one subsequent user interaction, wherein the subsequent user interaction is determined to have been entered by an identified user of the computing device for whom adaptation information is stored in a user profile for the identified user, and wherein the subsequent user interaction occurred at a region associated with an input value; and
 determine an intended input value different from the input value associated with the region of the subsequent user interaction, the determining being based on a property of the subsequent user interaction and the adaptation information for the identified user, wherein the property of the subsequent user interaction comprises speed, force, or angle.

* * * * *